May 8, 1928. 1,669,343
C. C. McCREARY
WEED KILLER
Filed Jan. 29. 1927
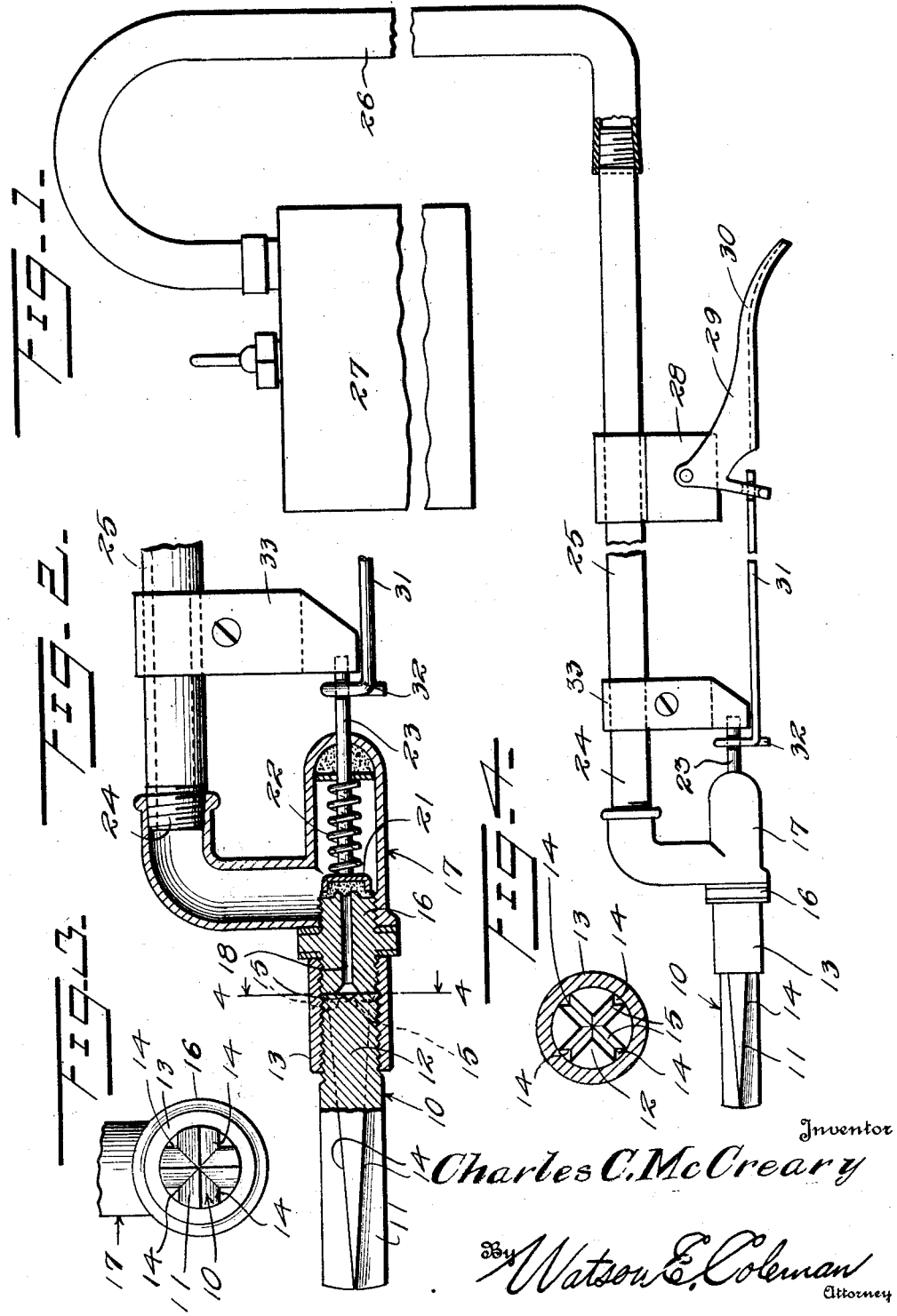
Inventor
Charles C. McCreary
By Watson E. Coleman
Attorney Patented May 8, 1928.

1,669,343

UNITED STATES PATENT OFFICE.

CHARLES C. McCREARY, OF PORTLAND, OREGON, ASSIGNOR OF ONE-HALF TO WILLIAM V. RASER, OF PORTLAND, OREGON.

WEED KILLER.

Application filed January 29, 1927. Serial No. 164,539.

This invention relates to weed killers and more particularly to a device for killing weeds by applying a liquid thereto.

An important object of the invention is to provide a device of this character having means for splitting the weed root, so that the liquid may be applied directly to the heart thereof.

A further and more specific object of the invention is the provision of a knife for splitting the weed root and means for conducting a liquid to the knife for application to the split weed root, which provides a handle through which the knife may be wielded.

A further object of the invention is to provide means for controlling the amount of liquid which is supplied to the knife.

These and other objects I attain by the construction shown in the accompanying drawings, wherein for the purpose of illustration is shown a preferred embodiment of my invention and wherein:—

Figure 1 is a side elevation of a weed killer constructed in accordance with my invention;

Figure 2 is a longitudinal sectional view through the control valve and knife mounting;

Figure 3 is an end elevation of the knife;

Figure 4 is a section on the line 4—4 of Figure 2.

Referring now more particularly to the drawings, the numeral 10 generally designates a knife having radially extending blades 11 joined at their centers. These blades are adapted to be forced into a weed root to split the same into four sections and expose the heart thereof. The shank 12 of the blades or knife is exteriorly threaded for engagement in the threaded bore of a nipple 13 and the exterior face of the shank is provided with longitudinally extending grooves 14 communicating with the space between adjacent blades. These grooves at the ends of the shank communicate with concentered radially extending grooves 15.

The nipple 14 is engaged with one end of a plug 16 forming the outlet section of a valve, generally designated at 17. The plug has a bore 18, one end of which communicates with the concentered grooves 15 and so with the space between the blades 11.

The valve 21 coacts with the opposite end of the bore 18 and is normally positioned to close the same by a spring 22 surrounding the valve stem 23. This valve stem is preferably co-axial with the knife 11 and projects exteriorly of the valve casing 17. The valve casing 17 has an inlet 24 offset with respect to the axis of the valve stem and adapted to receive one end of a rigid conduit 25, which provides a handle through which the knife 11 may be manipulated. The opposite end of this rigid conduit connects with a flexible conduit 26 leading to a suitable pressure storage tank 27 in which fluid to be applied to the weeds may be stored. Adjacent the free end of the rigid conduit 25 of a clamping bracket 28 is secured thereto, this bracket forming the pivot for a bent operating lever 29, one end of which forms a handle 30 and the opposite end of which engages one end of a link 31. The opposite end of this link engages the outer end of the stem 23, as at 32. Adjustably mounted upon the conduit 25 and extended into the bent end of the link which engages the stem is a second bracket 33, which limits the movement of the valve stem by the handle and thus determines the amount of liquid which may pass through the port 18 to the knife.

In the use of the implement the knife is forced into the heart of the weed and the handle 29 manipulated to permit a desired amount of the liquid to pass through the port 18. By this operation, the liquid is applied directly to the heart of the weed, with the result that the weed is positively destroyed without scattering the destroying liquid over any adjacent plants or foliage.

It will be obvious that the construction hereinbefore set forth is capable of a certain range of change and modification without materially departing from the spirit of the invention and I accordingly do not limit myself to such specific structure except as hereinafter claimed.

I claim:—

1. Means for destroying weeds comprising a knife, a valve from the outlet of which the shank of the knife is supported, means for conducting fluid from the outlet to the blade of the knife, a rigid conduit communicating with the inlet of the valve and providing a handle through which the knife may be wielded, the valve having a stem paralleling said conduit, a bracket secured to the conduit adjacent the free end thereof, a handle pivoted upon said bracket, a link connected at one end to the handle to be moved thereby and at its opposite end having an offset portion engaging the stem of the valve and a member embracing said conduit adjacent the valve stem and extending into the path of said offset portion to limit the movement thereof in the direction opening said valve, said member being adjustable upon the conduit.

2. Apparatus for killing weeds comprising, in combination, a knife having a plurality of radiating blades joined at their centers, the blades being sharpened at one end of the knife and combining at the opposite end thereof to provide a shank, the end of the shank having radially extending grooves communicating with the spaces between adjacent faces of the blades and means for delivering a poisonous substance to said grooves.

In testimony whereof I hereunto affix my signature.

CHARLES C. McCREARY.